United States Patent
Narayanaswami et al.

(10) Patent No.: US 9,418,367 B2
(45) Date of Patent: Aug. 16, 2016

(54) CONTEXT-AWARE CODE PROVISIONING FOR MOBILE DEVICES

(75) Inventors: Chandrasekhar Narayanaswami, Wilton, CT (US); Mandayam T. Raghunath, Bangalore (IN); Marcel C. Rosu, Ossining, NY (US)

(73) Assignees: International Business Machines Corporation, Armonk, NY (US); Institute for Information Technology Advancement, Daejeon (KR)

( * ) Notice: Subject to any disclaimer, the term of this patent is extended or adjusted under 35 U.S.C. 154(b) by 898 days.

(21) Appl. No.: 11/507,178

(22) Filed: Aug. 21, 2006

(65) Prior Publication Data

US 2008/0045172 A1   Feb. 21, 2008

(51) Int. Cl.
*H04W 64/00* (2009.01)
*G06Q 30/02* (2012.01)

(52) U.S. Cl.
CPC .................................... *G06Q 30/02* (2013.01)

(58) Field of Classification Search
None
See application file for complete search history.

(56) References Cited

U.S. PATENT DOCUMENTS

| | | | |
|---|---|---|---|
| 6,446,004 B1 | 9/2002 | Cao | |
| 6,587,870 B2 | 7/2003 | Takagi | |
| 7,072,672 B1 * | 7/2006 | Vanska | G06F 8/62 455/414.1 |
| 7,143,241 B2 * | 11/2006 | Hull | H04L 67/18 455/456.1 |
| 7,257,583 B2 * | 8/2007 | Hofmeister et al. | 707/10 |
| 2002/0176579 A1 * | 11/2002 | Deshpande et al. | 380/270 |
| 2003/0187920 A1 * | 10/2003 | Redkar | 709/203 |
| 2004/0171379 A1 * | 9/2004 | Cabrera et al. | 455/422.1 |
| 2004/0174981 A1 | 9/2004 | Ushida | |
| 2005/0215238 A1 * | 9/2005 | Macaluso | G06Q 30/02 455/414.1 |
| 2006/0026304 A1 * | 2/2006 | Price | 710/8 |
| 2006/0089157 A1 * | 4/2006 | Casey | H04L 67/04 455/456.3 |
| 2006/0234758 A1 * | 10/2006 | Parupudi | H04M 1/72563 455/550.1 |
| 2007/0232223 A1 * | 10/2007 | Bilange | 455/3.06 |
| 2007/0276516 A1 * | 11/2007 | Kaarela et al. | 700/83 |

OTHER PUBLICATIONS

Rousu, Marcel-Catalin, et al., Celadon: a Novel Architecture for Symbiotic Computing, Paper: IBM T.J. Watson Research Center, NY USA, 16 pages.
Rommel, J.; The Java-enabled wireless world, Java World online publication, 2000; at http://www.javaworld.com/javaworld/jw-03-2000/jw-03-wireless.html (last visited Jun. 2007).
Highway, Breakthrough intelligent maps & geographic tools for context-aware delivery of e-safe & value-added services, published document, IST-2003-507260, pp. 25, 2004.

* cited by examiner

*Primary Examiner* — Vladimir Magloire
*Assistant Examiner* — Frank Donado
(74) *Attorney, Agent, or Firm* — Ference & Associates LLC

(57) ABSTRACT

A simplification of the process of deploying public services for mobile users Particular refinements in this vein involve the dynamic configuration of client software using available context information and the optimization of software provisioning based on historical usage information, which includes services accessed together with the location and time of access.

20 Claims, 1 Drawing Sheet

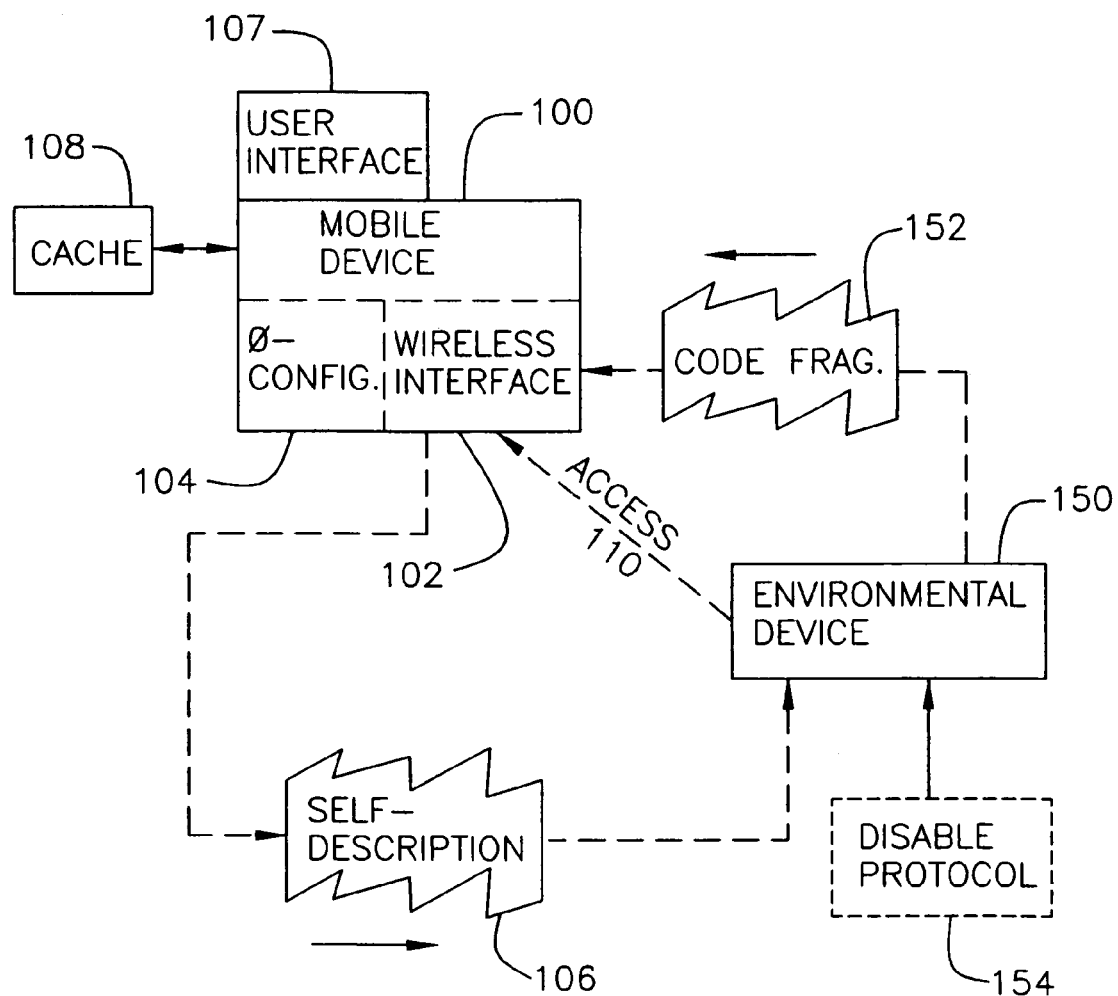

CONTEXT-AWARE CODE PROVISIONING FOR MOBILE DEVICES

FIELD OF THE INVENTION

The present invention relates to mobile devices and their interface or interaction with standing services or environmental devices.

BACKGROUND OF THE INVENTION

Over the past several years, mobile device technologies have improved dramatically. Existing cell phones, PDAs, combinations of these, and other mobile devices have come to exhibit significant computing, storage, and connectivity capabilities.

Currently, new services are being deployed that mobile users can access using the devices just mentioned. Some of these services, such as web browsing on mobile devices, are independent of the user location while the client software and protocols used to access the services are standardized. Other services, such as accessing local vending machines and making payments using personal devices, could require custom software to be installed on the mobile device. Such custom software could for example convey the user's dietary restrictions, user's health conditions such as glucose and salt levels, snacking preferences, membership status in a frequent snacker's club, discount coupons, pricing information, etc. Another example in the latter category is an environmental display service, which allows mobile users to display information on large, public screens, and use their mobile devices to control these presentations.

Clearly, it is impossible to provision mobile devices with the client software needed for accessing all of types of services in the genres just discussed since the services may become available after the device is manufactured and also because there may be limited room to hold software for all services that the user may encounter. Mobile devices may have to use different versions of the same client software for accessing the same service from different servers, for a variety of reasons related to the server hardware, maintenance costs, etc. Even more importantly, when new services are rolled out, it becomes prohibitively expensive to automatically fully re-provision mobile devices that are already out in the field with the software necessary to use these new services. Finally, asking users to download and install the client software manually is inconvenient and error-prone.

Currently, mobile devices tend to be provisioned with the software necessary for accessing a limited number of services, while client software is usually made available for installation when mobile users subscribe to a new service or when they first access a new service. In this context, given that mobile device cannot store all the software they will potentially ever need to use due to their limited resources, a need has been recognized in connection with optimizing the usage of mobile device resources for storing or on-demand loading of the client software required for accessing public services available locally.

SUMMARY OF THE INVENTION

In accordance with at least one presently preferred embodiment of the present invention, the process of deploying public services for mobile users that require specialized client software is greatly simplified. Particular refinements in this vein involve the dynamic configuration of client software using available context information and the optimization of software provisioning based on historical usage information, which includes services accessed together with the location and time of access.

In summary, one aspect of the present invention provides a method of managing resources of a mobile device, said method comprising the steps of: ascertaining at least one condition under which the mobile device is to operate; ascertaining software-related resources related to operation of the mobile device under the at least one condition; establishing software-related resources for use at the mobile device; and determining whether to retain pre-existing software-related resources for use at the mobile device.

Another aspect of the invention provides an apparatus for managing resources of a mobile device, said apparatus comprising the steps of: an arrangement which ascertains at least one condition under which the mobile device is to operate; an arrangement which ascertains software-related resources related to operation of the mobile device under the at least one condition; an arrangement which establishes software-related resources for use at the mobile device; and an arrangement which determines whether to retain pre-existing software-related resources for use at the mobile device.

Furthermore, an additional aspect of the invention provides a program storage device readable by machine, tangibly embodying a program of instructions executable by the machine to perform method steps for managing resources of a mobile device, said method comprising the steps of: ascertaining at least one condition under which the mobile device is to operate; ascertaining software-related resources related to operation of the mobile device under the at least one condition; establishing software-related resources for use at the mobile device; and determining whether to retain pre-existing software-related resources for use at the mobile device.

BRIEF DESCRIPTION OF THE DRAWINGS

The above and other objects, features, and advantages of the present invention will become more apparent from the following detailed description when taken in conjunction with the accompanying drawings, in which:

FIG. 1 schematically illustrates a wireless mobile device and its interaction with an environmental device.

DETAILED DESCRIPTION OF THE INVENTION

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

Many of the functional units described in this specification have been labeled as modules. Modules may be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

There are broadly contemplated herein, in accordance with at least one presently preferred embodiment of the present invention, methods and apparatus for optimization of the dynamic provisioning of mobile (wireless) devices with the client software modules necessary for accessing public services that are available locally. The client software modules implement the custom user interface and protocol for accessing the public service. Rather than trying to preinstall on the mobile device all the software modules that will fit on the device and may be used to access a service at a possibly small subset of locations, we assume that it is possible to install a client software module on-demand and remove it when it is not being used, to facilitate use of services at larger set of locations. There is proposed herein a collection of optimization techniques for the management of client software modules such that the number of installation of client software modules on-demand, immediately before the user attempts to use the service, either directly from the device implementing the public service or from a publicly accessible second device providing support to the device offering the service, is minimized. In the following, to simplify the description, without loss of generality we assume that the device offering the service and the second publicly accessible device are always the same. Public devices have much higher storage capacities and very good connectivity. As a result, they are capable of delivering software modules customized to the service type and location, and to the device type (manufacturer, model, software version, etc.) and device state (battery level, network connectivity, such as BT or 802.11, user preferences, such as preferred profile/language at the given location, etc), user status such as Gold, Silver, user activity (sitting in a train, working from a taxi), whether user is indoors, outdoors, other status reported by sensors on the user's device such as light conditions, noise level, image of the user's surroundings, etc. However, optimizing the resources of the mobile device is needed because on-demand download of a client software module, depending on its size, is both time and battery consuming.

More importantly, since the public device is the one that is offering the service, the public device or another device to which the public device in turn has access to is an appropriate place to store the corresponding client software module necessary for interacting with the service. The service provider creates this client code along with the service and deploys it. A primary advantage enjoyed is that the requirements for the mobile devices software are reduced to one, or just a few, protocols necessary for downloading the locally-available client software, and supporting a runtime environment that can host and run the downloaded code in a secure manner.

One aspect of the preferred embodiment addresses the optimization of software cached on the mobile device based on the characteristics of the modules needed for the service. These characteristics include the size of the module, the time and energy it takes to download the module, the time necessary to configure, initialize and start the module, and the usage pattern and frequency of the module. For instance, large and frequently used client modules, which are expected to require a large amount of energy to download, will be more likely to be cached in the mobile device than small and rarely used modules. In another example, a module for a service that pays tolls for the user while crossing a bridge at highway speeds is also more likely to be kept in the device's cache with high priority since there would not be enough time to download it on demand while at the toll bridge. Similarly, services that take a long time to initialize and start running will be initialized and kept in memory so that execution can be fast when requested and user satisfaction can be high.

Another aspect of the preferred embodiment pertains to optimization knowing server characteristics. For example, if servers providing modules for services are expected to be unavailable due to maintenance, modules for such services will be preferentially retained in the cache. Modules for services available from servers that mandate strongly encrypted transport channels are also likely to be jettisoned from the device only after modules that can be obtained more easily are jettisoned due to the high energy costs associated with establishing secure transport channels and with transferring data across these channels. Finally, while the device is placed in a docking station, say to recharge its battery, at least some of the currently cached modules could be checked against the most recent versions if the docking station is connected to the Internet.

Another aspect according to at least one preferred embodiment of the present invention is found in collecting historical information about the usage of the specialized client software together with the usage context (location and time of day), and using the collected information to further optimize resource usage on the mobile device. Another example would be prefetching modules that are expected to be needed in the near future. Such a need can be also inferred from the user's schedule that may be stored on the mobile device as well. The amount of time spent by the user at the service station is also taken into account. As an example, modules implementing services that are highly likely to be invoked when the user has short, transient contact with the server will be given higher priority to be retained in the cache than other modules. Finally, while the device is placed in a docking station, say to recharge its battery, at least some of the modules expected to be used in the near future are prefetched at no battery or air-time costs, if the docking station is connected to the Internet.

Modules could also be customized for low battery operation to avoid consuming an already discharged battery for the download operation. Such modules may be small in size and offer a reduced set of features.

Another aspect according to at least one preferred embodiment of the present invention is found in addressing the dynamic configuration of the specialized client software using available context information. For instance, the user interface of the client device can dynamically reconfigure itself using environment-related information such as current location and the list of services available at the current location. Furthermore, access rights of the specialized client software can be modified based on the location, or more general context, of the mobile client. In this vein, certain sensitive applications may be disabled in some locations or some times of the day (e.g., looking at quarterly sales estimates while on a public train, disabling the device-resident components used for remote monitoring while outside of the service provider premises, etc.). Voice based input modules may be turned off if noise levels are very high and voice recognition accuracy will be too low. Similarly, handwriting input modules could be disabled based on excessive vibration.

Techniques from caching algorithms used in computers to manage pages in memory can be utilized in combination with the sets of guidelines described earlier to determine modules whose code is deleted from the mobile device. For example the system while satisfying earlier constraints may choose to delete the most recently used module if it is not likely to be used say for the remainder of the day. In other situations the module that was invoked a long time ago and has not been used for a while is deleted. The least frequently used module could also be removed. Another possibility is to delete the module that occupies the most space in the device. In practice, a combination of the above techniques will be applied.

Techniques from caching algorithms used in client devices to manage a local cache of web objects can be utilized in combination with the sets of guidelines described earlier to determine modules whose code is deleted from the mobile device. Similarly to web objects which represent related web pages, such as pages that are typically viewed in the same session, or related web page fragments, such as fragments that belong to the same page, mobile device modules that are related, such as those which provide functionality to another one, can be prefetched, or jettisoned from the cache together.

Techniques from caching algorithms used in web proxy caches to manage a network-accessible cache of web objects for a large population of mobile devices can also be used to manage the caches of mobile devices or of environmental devices in support of devices providing public services. Furthermore, these prefetching and caching algorithms on mobile and environmental devices are self-improving as they learn the benefits of using any of the possible caching and prefetching policies. Lessons learned by one device, either mobile or environmental, can be transferred to another device of the same type if their most relevant characteristics match; for instance, when two mobile devices have very similar characteristics and their users have very similar profiles.

A specific implementation of features such as those discussed above, and with relation to the schematic illustration shown in FIG. 1, will most preferably involve the availability of certain capabilities on the mobile device as well as on the environmental devices providing the services to the mobile device. First, the mobile device (100) should preferably be capable of discovering the services and the environmental devices or infrastructure hosting them (150); sometimes, co-located services share locally-available infrastructure, which includes support services and the devices used to run them. More specifically, the mobile device 100 should preferably feature a wireless interface 102 for one of the standard technologies (e.g., 802.11, Bluetooth) and the software stack(s) of one or more zero-configuration protocols (104), such as UPNP or Bonjour. (Whether mobile devices specifically employ the inventive features discussed herein or are statically provisioned with all the client software modules required for accessing the services, the devices should preferably feature both the wireless interface and the zero-configuration protocol stack[s]. Similar considerations can apply to the environmental devices or infrastructure.)

Next, mobile device 100 should preferably be able to download and securely run code fragments (or modules) 152 from the environmental device 150; in this vein, the environmental device or infrastructure 150 should preferably be able to provide the appropriate fragments to the mobile device 100, upon request from the latter. For instance, after mobile device 100 discovers a locally-available service hosted on an environmental device 150, it should be able to automatically download the code fragments (152) necessary for accessing these services and the information necessary for dynamically configuring the execution of these fragments. Such a configuration may include changing the device's user interface to make the functionality implemented by these fragments available to the mobile user or establishing new execution sandboxes, which are runtime environments with customized, service-specific access rights, and porting underlying APIs to run these fragments.

For these actions to be possible, the mobile device should preferably:

implement protocols for describing themselves, possibly using Composite Capabilities/Preference Profile (CC/PP) profiles, thereby sending some form of self-description 106 to environmental device 150 as warranted;

support a framework for securely downloading and executing code fragments, possibly one of the available implementations of the Open Services Gateway Initiative (OSGi) specification, such as IBM's SMF;

allow for the establishment and configuration execution sandboxes with precisely defined protection domains, such as those implemented by Java 2 runtimes; and feature an extensible user interface 107, such as Eclipse's workbench.

In addition, the environmental devices and infrastructure should preferably provide support for securely providing the appropriate client modules as they are requested. In addition, the mobile device 100 should preferably include a cache 108 and provide support for caching downloaded client modules and mechanisms that can verify if a needed code module is already in the cache, therefore avoiding the download of code that is already in the cache 108. All these are new features that the mobile and environmental devices should preferably be able to support.

Finally, after modules are downloaded or found in the local device cache 108, the user of mobile device 100 can use the device's user interface 107, which has been dynamically configured for the usage context, to access (110) the locally available environmental device 150 to benefit from any information/data/tasks that would be available from environmental device 150. The most important steps are preferably recorded to help identify repeating usage patterns and decide which modules should be prefetched before they are expected to be required or kept in the local memory of the mobile device 100, for further usage, when additional storage space is needed on the mobile device for reasons including the on-demand or prefetched loading of a module.

As discussed heretofore, a disable protocol 154 can preferably be provided to selectively disable the provision of information/tasks/services away from environmental device 150 in response to given conditions (e.g., location, time of day, sensitivity of information, etc.)

It should be appreciated that while known examples do exist of interfaces for desktop client software that reconfigure themselves based on usage history, such techniques would only be able to provide limited benefits when applied to mobile applications with location-dependent usage. The embodiments of the present invention, as broadly contemplated herein, do address and overcome such limitations.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

The invention claimed is:

1. A method of managing resources of a mobile device, said method comprising the steps of:
    ascertaining a location under which the mobile device is to operate;
    ascertaining software-related resources related to operation of the mobile device to access one or more public services offered by an environmental device at the location;
    obtaining the software-related resources for use at the mobile device;
    determining whether to retain at least one previously obtained software-related resource in cache for future access at the mobile device based on at least one characteristic of a previously obtained software-related resource, wherein the determining whether to retain at least one previously obtained software-related resource in cache is further based on at least one characteristic of the mobile device;
    the at least one characteristic of the mobile device being selected from the group of characteristics consisting of: battery level of the mobile device and location of the mobile device;
    removing at least one previously obtained software related resource based on the at least one characteristic of a previously obtained software-related resource and the at least one characteristic of the mobile device;
    wherein said at least one characteristic of a previously obtained software-related resource comprises a usage pattern of the at least one previously obtained software-related resource; and
    dynamically configuring the software-related resources based on context information associated with the location.

2. The method according to claim 1, wherein:
    said step of ascertaining a location comprises ascertaining an environment in which the mobile device is to operate; and
    said step of ascertaining software-related resources comprises ascertaining at least one software module related to operation of the mobile device in the environment.

3. The method according to claim 2, wherein said step of ascertaining software-related resources comprises:
    ascertaining at least one characteristic associated with the mobile device; and
    determining one or more aspects of the software module which correspond to the at least one characteristic associated with the mobile device.

4. The method according to claim 3, wherein:
    the software module defines a local service associated with the environment in which the mobile device is to operate;
    said method further comprises the step of availing the local service to the mobile device.

5. The method according to claim 3, wherein:
    said obtaining step comprises wirelessly obtaining the one or more determined aspects of at least one software module from one of the environmental device and another publicly available device; and
    said method further comprises the step of providing at least a partial self-description of the mobile device.

6. The method according to claim 1, wherein said obtaining step further comprises:
    obtaining software relating to at least one zero-configuration protocol.

7. The method according to claim 1, wherein determining whether to retain at least one previously obtained software-related resource at the mobile device further comprises:
    prioritizing and choosing at least one software module to retain in cache based on characteristics associated with one or more software modules;
    prioritizing and choosing at least one software module to retain in cache based on characteristics of expected future usage;
    prioritizing and choosing at least one software module to retain in cache based on current status of the mobile device; and
    prioritizing and choosing at least one software module to retain in cache based on characteristics of one or more servers which provide software modules.

8. The method according to claim 1, wherein said step of ascertaining a location comprises applying and managing access rights to specialized software-related resources related to operation of the mobile device in an environment in which the mobile device is to operate.

9. The method according to claim 1, further comprising the step of disabling at least one of the software related resources in response to at least one predetermined condition.

10. The method according to claim 1, wherein said at least one characteristic further comprises one or more of: size of a previously obtained software-related resource, time and energy necessary to download a previously obtained software-related resource, time necessary to configure, initialize and start a previously obtained software-related resource, and a server characteristic from which a previously obtained software-related resource was obtained.

11. The method according to claim 1, wherein said determining further comprises collecting and using historical information about usage of resident software-related resources to prioritize and choose at least one priority software-related resource to retain in cache for future access by the mobile device;
    wherein a software-related resource that is frequently used as defined by a predetermined criteria is retained; and
    wherein a software-related resource that is rarely used as defined by a predetermined criteria is removed.

12. An apparatus for managing resources of a mobile device, said apparatus comprising:
    a processor;
    an arrangement which ascertains a location under which the mobile device is to operate;
    an arrangement which ascertains software-related resources to operation of the mobile device to access one or more public services offered by an environmental device at the location;
    an arrangement which obtains the software-related resources for use at the mobile device;
    a determining arrangement which determines whether to retain at least one previously obtained software-related resource in cache for future access at the mobile device based on at least one characteristic of a previously obtained software-related resource, wherein the determining arrangement which determines whether to retain at least one previously obtained software-related resource in cache is further based on at least one characteristic of the mobile device;
    the at least one characteristic of the mobile device being selected from the group of characteristics consisting of: battery level of the mobile device and location of the mobile device;
    an arrangement which removes at least one previously obtained software related resource based on the at least one characteristic of a previously obtained software-related resource and the at least one characteristic of the mobile device;

wherein the at least one characteristic of a previously obtained software-related resource comprises a usage pattern of the at least one previously obtained software-related resource; and an arrangement which dynamically configures the software-related resources based on context information associated with the location.

13. The apparatus according to claim 12, wherein:

said arrangement which ascertains a location acts to ascertain an environment in which the mobile device is to operate; and said arrangement which ascertains software-related resources acts to ascertain at least one software module related to operation of the mobile device in the environment.

14. The apparatus according to claim 13, wherein said arrangement which ascertains software-related resources acts to:

ascertain at least one characteristic associated with the mobile device; and determine one or more aspects of the software module which correspond to the at least one characteristic associated with the mobile device.

15. The apparatus according to claim 14, wherein:

the software module defines a local service associated with the environment in which the mobile device is to operate;

said apparatus further comprises an arrangement which avails the local service to the mobile device.

16. The apparatus according to claim 14, wherein:

said arrangement which obtains acts to wirelessly obtain the one or more determined aspects of at least one software module; and said arrangement which obtains software-related resources acts to provide at least a partial self-description of the mobile device.

17. The apparatus according to claim 12, further comprising at least one of:

an arrangement which obtains software relating to at least one zero-configuration protocol.

18. The apparatus according to claim 12, wherein said determining arrangement further acts to:

to perform the following steps:

prioritize and choose at least one software module to retain in cache based on characteristics associated with one or more software modules;

prioritize and choose at least one software module to retain in cache based on characteristics of expected future usage;

prioritize and choose at least one software module to retain in cache based on current status of the mobile device; and prioritize and choose at least one software module to retain in cache based on characteristics of one or more servers which provide software modules.

19. The apparatus according to claim 12, wherein said arrangement which ascertains a location acts to apply and manage access rights to specialized software-related resources related to operation of the mobile device in an environment in which the mobile device is to operate.

20. A non-transitory program storage device readable by machine embodying a program of instructions executable by the machine to perform steps for managing resources of a mobile device, said steps comprising:

ascertaining a location under which the mobile device is to operate;

ascertaining software-related resources related to operation of the mobile device to access one or more public services offered by an environmental device at the location;

obtaining the software-related resources for use at the mobile device;

determining whether to retain at least one previously obtained software-related resource in cache for future access at the mobile device based on at least one characteristic of a previously obtained software-related resource, wherein the determining whether to retain at least one previously obtained software-related resource in cache is further based on at least one characteristic of the mobile device;

the at least one characteristic of the mobile device being selected from the group of characteristics consisting of: battery level of the mobile device and location of the mobile device:

removing at least one previously obtained software related resource based on the at least one characteristic of a previously obtained software-related resource and the at least one characteristic of the mobile device;

wherein said at least one characteristic of a previously obtained software-related resource comprises a usage pattern of the at least one previously obtained software-related resource; and dynamically configuring the software-related resources based on context information associated with the location.

\* \* \* \* \*